(12) United States Patent
Burzanowska et al.

(10) Patent No.: US 7,965,057 B2
(45) Date of Patent: Jun. 21, 2011

(54) METHOD FOR OPERATION OF A THREE-PHASE ROTATING ELECTRICAL MACHINE, AND AN APPARATUS FOR CARRYING OUT THE METHOD

(75) Inventors: Halina Burzanowska, Untersiggenthal (CH); Pieder Jörg, Domat/Ems (CH); Petteri Sario, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 482 days.

(21) Appl. No.: 12/133,162

(22) Filed: Jun. 4, 2008

(65) Prior Publication Data

US 2008/0303462 A1 Dec. 11, 2008

(30) Foreign Application Priority Data

Jun. 5, 2007 (EP) .................................. 07109627

(51) Int. Cl.
*H02P 27/04* (2006.01)
(52) U.S. Cl. ..................... 318/800; 318/400.1; 318/700; 318/716; 318/798; 318/799
(58) Field of Classification Search ............... 318/400.1, 318/700, 716, 798, 799, 800
See application file for complete search history.

(56) References Cited

U.S. PATENT DOCUMENTS

| | | | | |
|---|---|---|---|---|
| 6,396,236 B1 * | 5/2002 | Luukko | ........................... | 318/700 |
| 6,741,059 B2 * | 5/2004 | Gokhale et al. | ............... | 318/700 |
| 7,015,667 B2 * | 3/2006 | Patel et al. | .................... | 318/432 |
| 7,098,623 B2 * | 8/2006 | Piippo | ........................... | 318/721 |
| 7,330,010 B2 * | 2/2008 | Schroderus et al. | .......... | 318/716 |
| 7,746,039 B2 * | 6/2010 | Hoffmann et al. | ............... | 322/89 |
| 2006/0279247 A1 * | 12/2006 | Schroderus et al. | .......... | 318/716 |

FOREIGN PATENT DOCUMENTS

| | | |
|---|---|---|
| EP | 1 521 356 A2 | 4/2005 |
| EP | 1 553 693 A1 | 7/2005 |
| EP | 1 722 469 A | 11/2006 |
| EP | 1 732 204 A1 | 12/2006 |

OTHER PUBLICATIONS

EPO Search Report.

* cited by examiner

*Primary Examiner* — Walter Benson
*Assistant Examiner* — Kawing Chan
(74) *Attorney, Agent, or Firm* — Buchanan Ingersoll & Rooney PC

(57) ABSTRACT

A method and apparatus are provided for operation of a three-phase rotating electrical machine which has at least two stator winding sets and each stator winding set has three phase windings connected in star, and the star circuits of the stator winding sets have a phase shift of 30 degrees electrical with respect to one another, and an associated converting unit is respectively provided for each stator winding set, in which method the respective stator winding set is fed by the associated converter unit, and a respectively associated regulation device is provided for each converter unit, and each converter unit is driven by means of a drive signal from the associated regulation device independently of regulation devices of the respective other converter units.

19 Claims, 3 Drawing Sheets

METHOD FOR OPERATION OF A THREE-PHASE ROTATING ELECTRICAL MACHINE, AND AN APPARATUS FOR CARRYING OUT THE METHOD

RELATED APPLICATION

This application claims priority under 35 U.S.C. §119 to European Patent Application No. 07109627.5 filed in Europe on Jun. 5, 2007, the entire content of which is hereby incorporated by reference in its entirety.

TECHNICAL FIELD

The disclosure relates to the field of operating methods for three-phase rotating electrical machines, and is based on a method for operation of a three-phase rotating electrical machine, and on an apparatus for carrying out the method.

BACKGROUND INFORMATION

Apparatuses for methods for operation of three-phase rotating electrical machines are increasingly required and are being used increasingly nowadays. One suitable apparatus, for example, is disclosed in EP 1 521 356 A2, which specifies a rotating electrical machine which has two stator winding sets. Furthermore, an associated converter unit is in each case provided to feed each stator winding set. A respectively associated regulation device is provided for each of the converter units, in order to drive the associated converter unit by means of a drive signal. Furthermore, measurement means are provided for measurement of the currents in a stator winding set, which measured currents are supplied to the associated regulation device, with this regulation device acting as a so-called "master", that is to say the measured currents of the "master" regulation device, of the other regulation device, which acts as a so-called "follower". The preset, that is to say the measured currents, is provided via a data line. In response to the currents predetermined by the "master" regulation device, the "follower" regulation device then emits an appropriate drive signal to its associated converter device, that is to say the drive signal of the "follower" regulation device is dependent on the preset from the "master" regulation device, with this preset representing a reference.

EP 1 732 204 A1 specifies a method for operation of a rotating electrical machine, in which method the respective stator winding set is fed by the associated converter unit. In order to allow redundant and independent regulation or in order to influence electrical variables of the individual stator winding sets of the rotating electrical machine, the currents are measured in at least n−1 phase windings of each stator winding set. A respectively associated regulation device is provided for each converter unit, and each converter unit is driven by means of a drive signal from the associated regulation device, independently of the regulation devices for each of the other converter units. Furthermore, the drive signal in the respective regulation device is formed from the measured currents in each stator winding set.

Furthermore, the two stator winding sets of the rotating electrical machine in EP 1 521 356 A1 and in EP 1 732 204 A1 are typically each connected in star, with the star circuits of the stator winding sets having a phase shift of 30 degrees electrical with respect to one another (referred to as: YY30). One undesirable phenomenon of such rotating electrical machines is that, in particular, fifth and seventh stator current harmonics with respect to the stator current fundamental, but in general the k-th stator current harmonics with respect to the stator current harmonic occur in both stator winding sets, where k=6n+/−1 and n=1, 3, 5, . . . . These stator current harmonics have a negative effect and are therefore unacceptable.

SUMMARY

A method for operation of a three-phase rotating electrical machine is disclosed, which can reduce k-th stator current harmonics with respect to the stator current fundamental in both stator winding sets of the rotating electrical machine, where k=6n+/−1 and n=1, 3, 5, . . . . Furthermore, an apparatus is specified, which can be implemented very simply, robustly and with little circuit complexity, and by means of which the method for operation can be carried out in a particularly simple manner.

A method for operation of a three-phase rotating electrical machine is disclosed which has two stator winding sets and each stator winding set has three phase windings connected in star, and the star circuits of the stator winding sets have a phase shift of 30 degrees electrical with respect to one another, and an associated converting unit is respectively provided for each stator winding set, in which the respective stator winding set is fed by the associated converter unit, in which a respectively associated regulation device is provided for each converter unit, and each converter unit is driven by means of a drive signal from the associated regulation device independently of regulation devices of the respective other converter units, wherein, with regard to the respective regulation device, the drive signal is produced in the regulation device by regulation of the actual torque value ($M_{actA}$, $M_{actB}$) at a predeterminable reference torque value ($M_{refA}$, $M_{refB}$) and a regulation of the actual stator flux value ($\psi_{actA}$, $\psi_{actB}$) at a total reference stator flux value ($\psi_{ref,\,totA}$, $\psi_{ref,\,totB}$), and in that, with regard to the respective regulation device, the total reference stator flux value ($\psi_{ref,\,totA}$, $\psi_{ref,\,totB}$) is formed from a predeterminable reference stator flux value ($\psi_{refA}$, $\psi_{refB}$) and from a difference stator flux value ($\psi_{eA}$, $\psi_{eB}$), with the difference stator flux value ($\psi_{eA}$, $\psi_{eB}$) being calculated from the difference between a first stator flux value ($\psi_{1A}$, $\psi_{1B}$) and a second stator flux value ($\psi_{2A}$, $\psi_{2B}$).

The three-phase rotating electrical machine has two stator winding sets, with each stator winding set comprising three phase windings connected in star, and with the star circuits of the stator winding sets having a phase shift of 30 degrees electrical with respect to one another, and with a respectively associated converter unit being provided for each stator winding set. In the method according to the disclosure, each stator winding set is now fed by the associated converter unit, with a respectively associated regulation device being provided for each converter unit and with each converter unit being driven by means of a drive signal from the associated regulation device, independently of regulations devices for each of the other converter units. According to the disclosure, with regard to the respective regulation device, the drive signal is produced in the regulation device by regulation of the actual torque value at a predeterminable reference torque value and a regulation of the actual stator flux value at a total reference stator flux value, and, with regard to the respectively associated regulation device, the total reference stator flux value is formed from a predeterminable reference stator flux value and from a difference stator flux value, with the difference stator flux value being calculated from the difference between a first stator flux value and a second stator flux value. The measures according to the disclosure as mentioned above allow k-th stator current harmonics with respect to the stator current fundamental to be advantageously reduced in both stator winding sets of the rotating electrical machine, where k=6n+/−1 and n=1, 3, 5, . . . .

An apparatus for carrying out a method for operation of a three-phase rotating electrical machine which has at least two stator winding sets and each stator winding set (A, B) comprises three phase windings connected in star, and the star circuits of the stator winding sets have a phase shift of 30 degrees electrical with respect to one another, in each case having an associated converter unit which is intended to feed each stator winding set, and in each case having an associated regulation device, which is provided for each converter unit, in order to drive the associated converter unit by means of a drive signal independently of regulation devices of the respective other converter units, wherein each regulation device has a regulator unit for regulation of the associated current torque value ($M_{actA}$, $M_{actB}$) at a predeterminable reference torque value ($M_{refA}$, $M_{refB}$), and for regulation of the associated actual stator flux value ($\psi_{actA}$, $\psi_{actB}$) at a predeterminable reference stator flux value ($\psi_{ref,\,totA}$, $\psi_{ref,\,totB}$), with the drive signal being produced in the output of the regulator unit, in that each regulation device has a first calculation unit for formation of the associated total reference stator flux value ($\psi_{ref,\,totA}$, $\psi_{ref,\,totB}$) from a predeterminable reference stator flux value ($\psi_{refA}$, $\psi_{refB}$) and from a difference stator flux value ($\psi_{eA}$, $\psi_{eB}$), and in that each regulation device has a subtractor for calculation of the associated difference stator flux value ($\psi_{eA}$, $\psi_{eB}$) from the difference between a first stator flux value ($\psi_{1A}$, $\psi_{1B}$) and a second stator flux value ($\psi_{2A}$, $\psi_{2B}$).

In another aspect, a system is disclosed based on a three-phase rotating electrical machine, comprising: two stator winding sets, each stator winding set having three phase windings connected in star; star circuits of the stator winding sets having a phase shift of 30 degrees electrical with respect to one another; an associated converting unit respectively provided for each stator winding set, the respective stator winding set being fed by the associated converter unit; and a respectively associated regulation device provided for each converter unit, each converter unit being driven by a drive signal from the associated regulation device independently of regulation devices of the respective other converter units. With regard to the respective regulation device, the drive signal is produced in the regulation device by regulation of the actual torque value ($M_{actA}$, $M_{actB}$) at a predeterminable reference torque value ($M_{refA}$, $M_{refB}$) and a regulation of the actual stator flux value ($\psi_{actA}$, $\psi_{actB}$) at a total reference stator flux value ($\psi_{ref,\,totA}$, $\psi_{ref,\,totB}$).

These and further exemplary features of the present disclosure will become evident from the following detailed description of exemplary embodiments of the disclosure, and in conjunction with the drawings.

Figure 1:
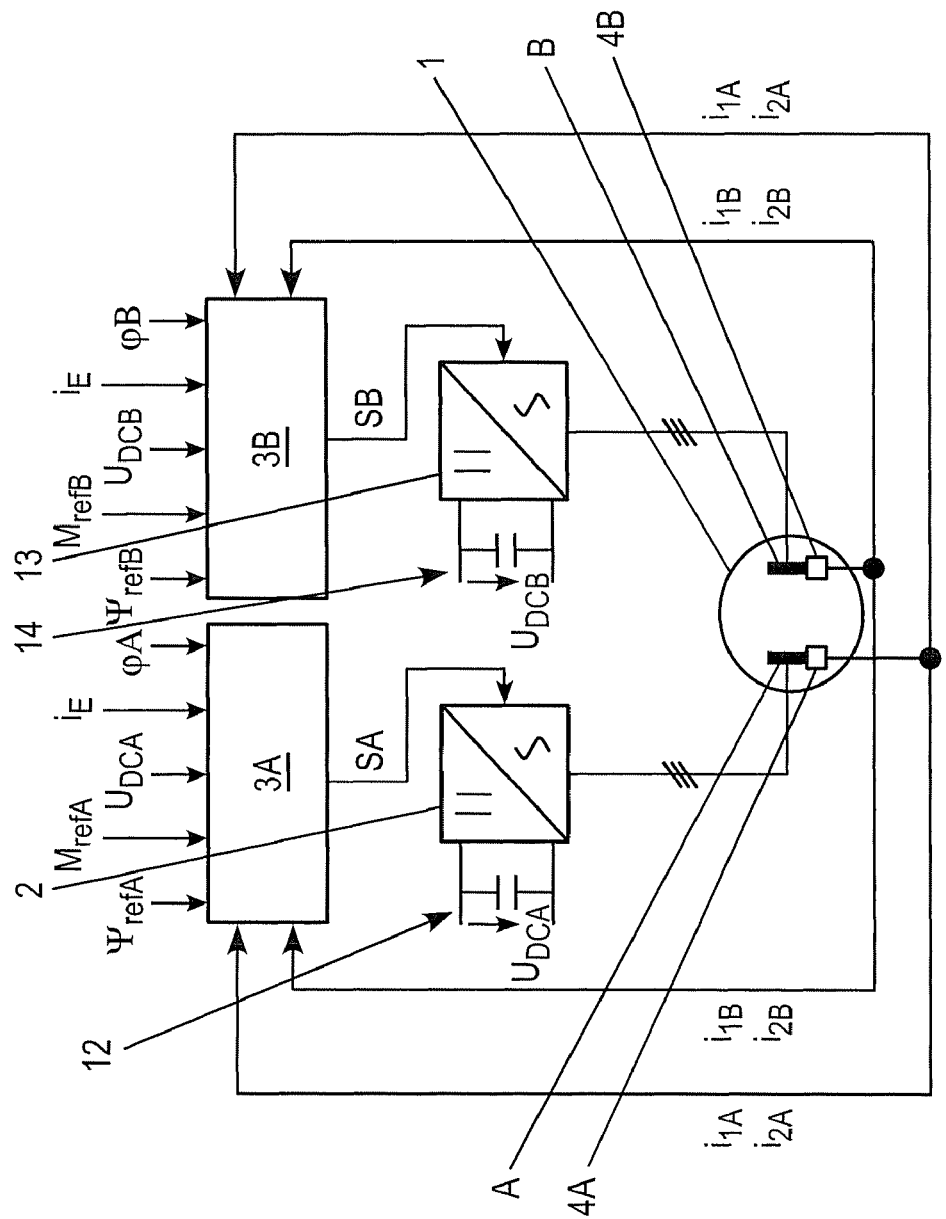
FIG. 1 shows a first exemplary embodiment of an apparatus according to the disclosure for carrying out the method according to the disclosure for operation of a rotating electrical machine, e.g., for a rotating electrical machine in the form of a synchronous machine.

The reference symbols used in the drawing and their meaning are listed in summarized form in the list of reference symbols. In principle, identical parts are provided with the same reference symbols in the figures. The described embodiments represent examples of the subject matter of the disclosure, and have no restrictive effect.

DETAILED DESCRIPTION

The apparatus according to the disclosure for carrying out the method for operation of a three-phase rotating electrical machine in each case has an associated converter unit, which is intended to feed each stator winding set, and in each case one associated regulation device, which is provided for each converter unit, for driving the associated converter unit by means of a drive signal independently of regulation devices for each of the other converter units. According to the disclosure, each regulation device now has a regulator unit for regulation of the associated current torque value at a predeterminable reference torque value, and for regulation of the associated actual stator flux value at a predeterminable reference stator flux value, with the drive signal being produced in the output of the regulator unit. Each regulation device also has a first calculation unit for formation of the associated total reference stator flux value from a predeterminable reference stator flux value and from a difference stator flux value. Furthermore, each regulation device has a subtractor for calculation of the associated difference stator flux value from the difference between a first stator flux value and a second stator flux value. The apparatus according to the disclosure can therefore be implemented very simply, robustly and with little circuit complexity, and the method according to the disclosure can also be carried out particularly easily, using the apparatus according to the disclosure. The respective regulation device for driving the associated converter unit independently of regulation devices for each of the other converter units means that the apparatus according to the disclosure is of redundant design, thus making it possible to achieve high availability and a high level of maintenance friendliness for the overall system. Furthermore, the apparatus according to the disclosure for carrying out the method according to the disclosure by means of the regulation devices makes it possible to reduce the k-th stator current harmonics with respect to the stator current fundamental in both stator winding sets of the rotating electrical machine, where k=6n+/−1 and n=1, 3, 5, . . . .

FIG. 1 shows a first exemplary embodiment of an apparatus according to the disclosure for carrying out the method according to the disclosure for operation of a three-phase rotating electrical machine 1, e.g., for a rotating electrical machine 1 in the form of a synchronous machine. The machine 1 has two stator winding sets A, B, with each stator winding set A, B comprising three phase windings connected in star, and with the star circuits of the stator winding sets, A, B having a phase shift of 30 degrees electrical with respect to one another, and with a respectively associated converter unit 2, 13 being provided for each stator winding set A, B. Each stator winding set A, B is fed by the associated converter unit 2, 13.

With regard to the method, a respectively associated regulation device 3A, 3B is provided for each converter unit 2, 13, with each converter unit 2, 13 being driven by means of a drive signal SA, SB of the associated regulation device 3A, 3B independently of regulation devices 3A, 3B of each of the other converter units 2, 13.

According to the disclosure, with regard to the respective regulation device 3A, 3B, now the drive signal SA, SB is produced in the regulation device 3A, 3B by regulation of the actual torque value $M_{actA}$, $M_{actB}$ at a predeterminable reference torque value $M_{refA}$, $M_{refB}$ and a regulation of the actual stator flux value $\psi_{actA}$, $\psi_{actB}$ at a total reference stator flux value $\psi_{ref, totA}$, $\psi_{ref, totB}$, and, with regard to the respective regulation device 3A, 3B, the total reference stator flux value $\psi_{ref, totA}$, $\psi_{ref, totB}$ is in turn formed from a predeterminable reference stator flux value $\psi_{refA}$, $\psi_{refB}$ and from a difference stator flux value $\psi_{eA}$, $\psi_{eB}$, with the difference stator flux value $\psi_{eA}$, $\psi_{eB}$ being calculated from the difference between a first stator flux value $\psi_{1A}$, $\psi_{1B}$ and a second stator flux value $\psi_{2A}$, $\psi_{2B}$. The abovementioned measures of the method according to the disclosure advantageously make it possible to reduce the k-th stator current harmonics with respect to the stator current fundamental in both stator winding sets A, B of the rotating electrical machine 1, where k=6n+/−1 and n=1, 3, 5, . . . .

With regard to the method, with regard to the respective regulation device 3A, 3B, the first stator flux value $\psi_{1A}$, $\psi_{1B}$ can be formed from the DC voltage $U_{DCA}$, $U_{DCB}$ of a capacitive energy store 12, 14 as shown in FIG. 1, which is connected to the respectively associated converter unit 2, 13, from a first stator current $i_{1A}$, $i_{1B}$ of the respectively associated stator winding set A, B, and from a second stator current $i_{2A}$, $i_{2B}$ of the respectively associated stator winding set A, B, in particular using a voltage model. Furthermore, with regard to the respective regulation device 3A, 3B, the second stator flux value $\psi_{2A}$, $\psi_{2B}$ is formed from the first stator current $i_{1A}$, $i_{1B}$ of each stator winding set A, B and from the second stator current $i_{2A}$, $i_{2B}$ of each stator winding set A, B, in particular using a current model.

The currents $i_{1A}$, $i_{1B}$, $i_{2A}$, $i_{2B}$ in the three phase windings of each stator winding set A, B are measured by measurement means 4A, 4B as shown in FIG. 1. The stator flux values $\psi_{1A}$, $\psi_{1B}$, $\psi_{2A}$, $\psi_{2B}$ formed in this way and the difference stator flux value $\psi_{eA}$, $\psi_{eB}$ formed from them allow the abovementioned k-th stator current harmonics with respect to the stator current fundamental to be reduced in a very simple manner in both stator winding sets A, B of the rotating electrical machine 1.

In a three-phase rotating electrical machine 1 which is in the form of a synchronous machine, with regard to the respective regulation device 3A, 3B, the second stator flux value $\psi_{2A}$, $\psi_{2B}$ is additionally formed from the rotor position $\phi A$, $\phi B$ (rotor position) and from the field current $i_E$. If no field winding is provided, for example as in the case of a synchronous machine with permanent magnet excitation, no field current $i_E$ is required to form the second stator flux value $\psi_2$. It should be mentioned that the rotor position $\phi A$, $\phi B$ can be measured, or is a calculated variable. The field current $i_E$ and the DC voltages $U_{DCA}$, $U_{DCB}$ of the respective capacitive energy store 12, 14 are each measured variables.

Furthermore, in the case of the three-phase rotating electrical machine 1 which is in the form of a synchronous machine, with regard to the respective regulation device 3A, 3B, the total reference stator flux value $\psi_{ref, totA}$, $\psi_{ref, totB}$ is additionally formed from a correction value WA, WB, with the correction value WA, WB being dependent on the predeterminable reference stator flux value $\psi_{refA}$, $\psi_{refB}$, on the predeterminable reference torque value $M_{refA}$, $M_{refB}$, on the rotor frequency $\omega$, or on the stator frequency $\omega$.

In general, that is to say without the indication of the variables used with respect to the stator winding sets A, B, the correction value W is formed using the following formula:

$$W(\omega, M_{ref}, \psi_{ref}) = \begin{cases} \left(1 - \frac{\omega}{\omega_{nom}}\right)^2 \cdot \left(1 + \frac{M_{ref}}{M_{max}}\right) & \omega < p \cdot \omega_{nom} \\ \left(1 - \frac{p \cdot \omega_{nom}}{\omega_{nom}}\right)^2 \cdot \left(1 + \frac{M_{ref}}{M_{max}}\right) & p \cdot \omega_{nom} < \omega < \omega_{nom} \\ \left(1 - \frac{p \cdot \omega_{nom}}{\omega_{nom}}\right)^2 \cdot \\ \left(1 + \frac{M_{ref}}{M_{max}}\right) \cdot \left(\frac{\psi_{nom}}{\psi_{ref}}\right)^{k_2} & \omega > \omega_{nom} \end{cases}$$

where $\omega$ is the rotor frequency or the stator frequency, $\omega_{nom}$ is the associated nominal rotor frequency or the nominal stator frequency, $M_{max}$ is the maximum permissible torque, $\psi_{nom}$ is the nominal stator flux, p is a first variable weighting parameter and $k_2$ is a second, variable weighting parameter. The total reference stator flux value $\psi_{ref, tot}$ is then formed, likewise without indication of the variables used, with respect to the stator winding sets A, B using the following formula:

$$\psi_{ref, tot} = (\psi_e \cdot (1-W)) + \psi_{ref}$$

With regard to the respective regulation device 3A, 3B, the actual stator flux value $\psi_{actA}$, $\psi_{actB}$, is also formed from the first stator flux value $\psi_{1A}$, $\psi_{1B}$, from the second stator flux value $\psi_{2A}$, $\psi_{2B}$, from the difference stator flux value $\psi_{eA}$, $\psi_{eB}$ and from the correction value WA, WB. Furthermore, with regard to the respective regulation device 3A, 3B, the actual torque value $M_{actA}$, $M_{actB}$, is formed from the actual stator flux value $\psi_{actA}$, $\psi_{actB}$, from the first stator current $i_{1A}$, $i_{1B}$ in the respectively associated stator winding set A, B, and from the second stator current $i_{2A}$, $i_{2B}$ in the respectively associated stator winding set A, B.

Figure 2:
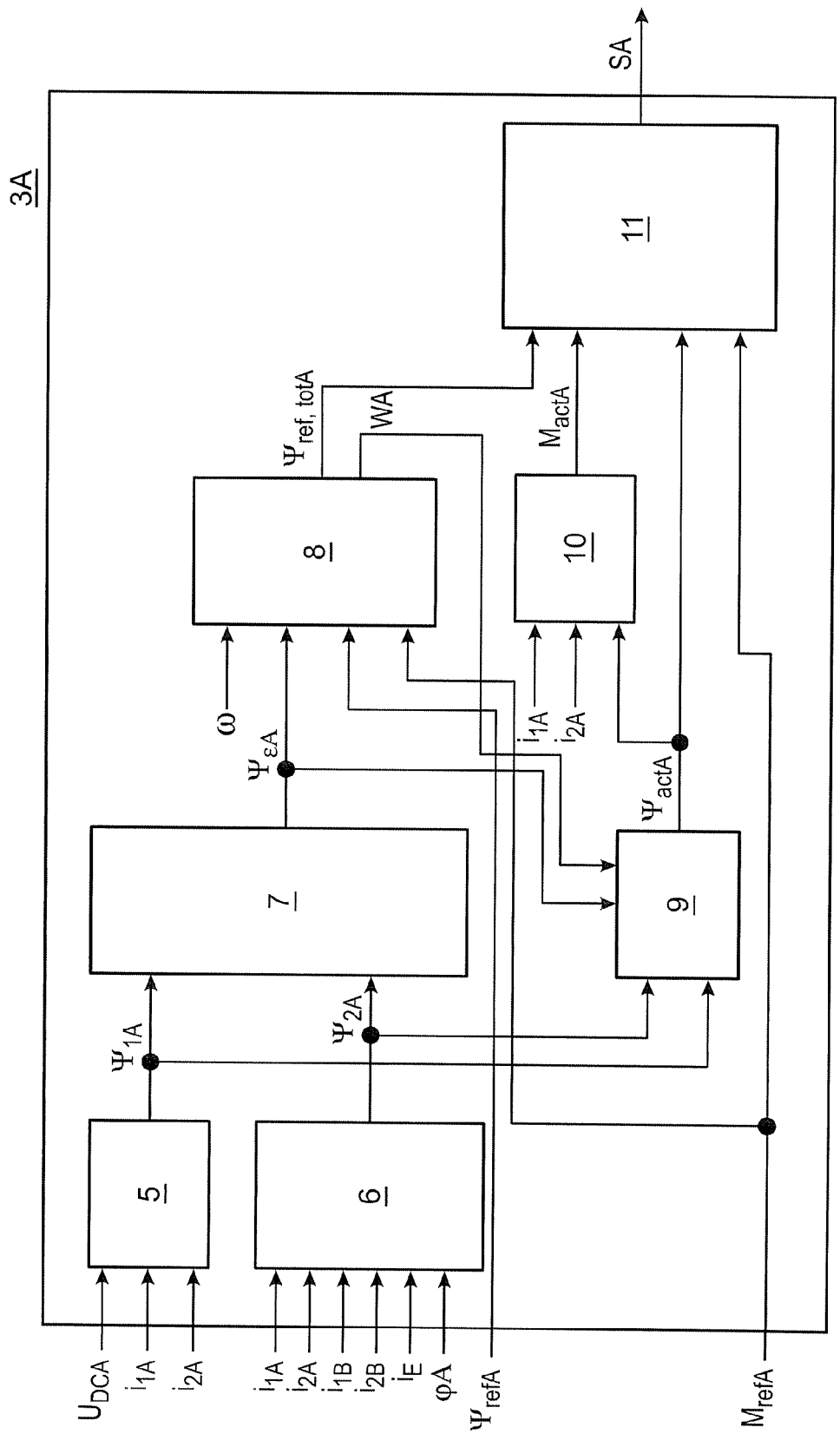
FIG. 2 shows one exemplary embodiment of a regulation device for the apparatus as shown in FIG. 1, for one stator winding set.
Figure 3:
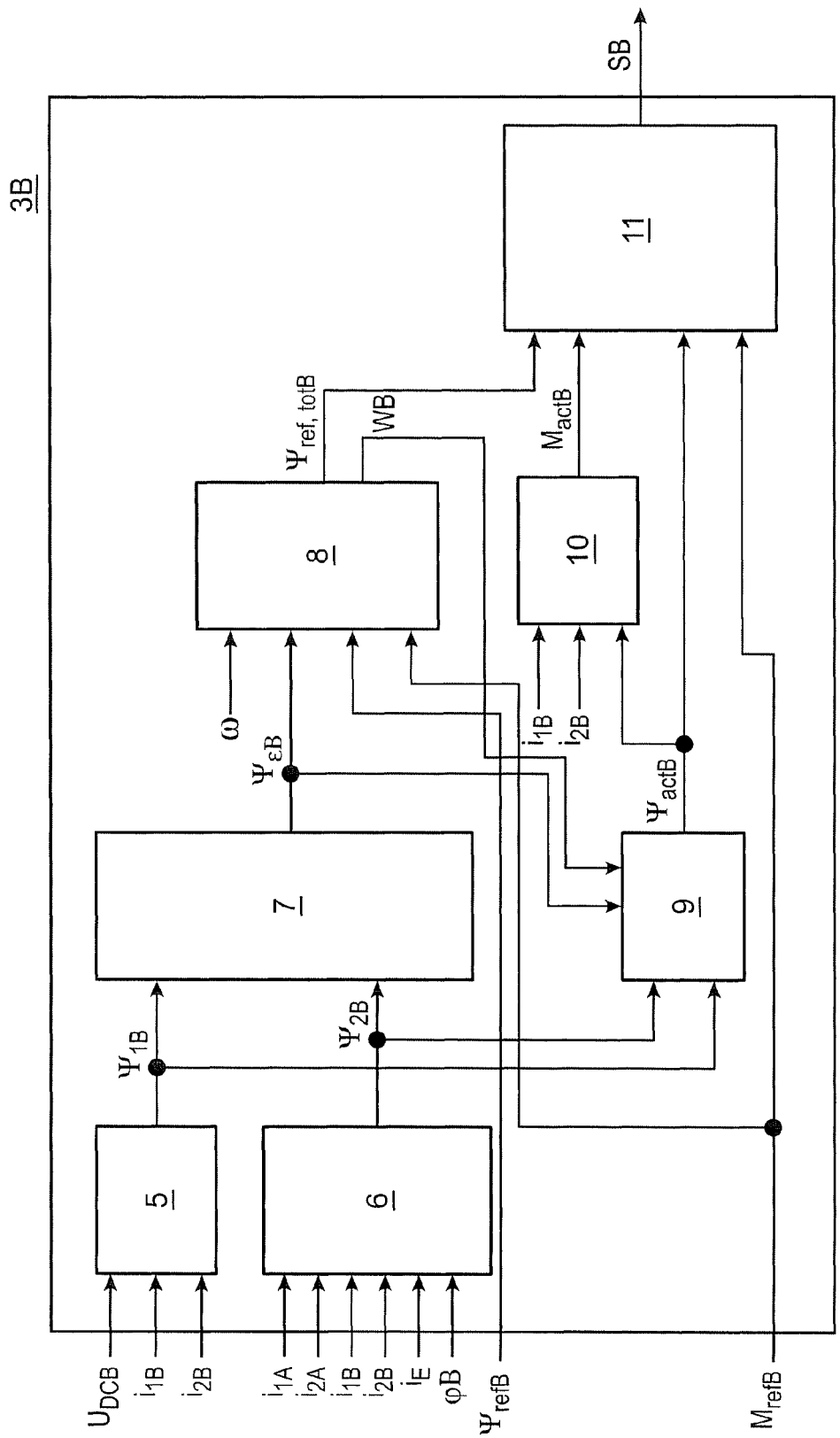
FIG. 3 shows one exemplary embodiment of a regulation device for the apparatus as shown in FIG. 1, for a further stator winding set.

As shown in FIG. 1, the apparatus according to the disclosure for carrying out the method according to the disclosure as described in detail above in each case comprises an associated converter unit 2, 13, which is intended to feed each stator winding set A, B, and a respectively associated regulation device 3A, 3B, which is provided for each converter unit 2, 13, for driving the associated converter unit 2, 13 by means of the drive signal SA, SB independently of the regulation devices 3A, 3B of each of the other converter units 2, 13. According to the disclosure, each regulation device 3A, 3B according to an exemplary embodiment of the regulation device 3A, 3B as illustrated in FIG. 2 and FIG. 3 has, in particular with regard to an associated stator winding set A, B of the apparatus shown in FIG. 1, a regulator unit 11 for regulation of the associated actual torque value $M_{actA}$, $M_{actB}$ at the predeterminable reference torque value $M_{refA}$, $M_{refB}$, and for regulation of the associated actual stator flux value $\psi_{actA}$, $\psi_{actB}$ at the predeterminable reference stator flux value $\psi_{ref, totA}$, $\psi_{ref, totB}$, with the drive signal SA, SB being produced in the output of the regulator unit 11. Furthermore, each regulation device 3A, 3B has a first calculation unit 8 for formation of the associated total reference stator flux value $\psi_{ref, totA}$, $\psi_{ref, totB}$ from a predeterminable reference stator flux value $\psi_{refA}$, $\psi_{refB}$ and from a difference stator flux value $\psi_{eA}$, $\psi_{eB}$, in which case, furthermore, each regulation device 3A, 3B has a subtractor 7 for calculation of the associated difference stator flux value $\psi_{eA}$, $\psi_{eB}$ from the difference between the first stator flux value $\psi_{1A}$, $\psi_{1B}$ and the second stator flux value $\psi_{2A}$, $\psi_{2B}$. The apparatus according to the disclosure is therefore designed to be implemented in a relatively simple manner and is very robust, in which case the method according to the disclosure can be carried out particularly easy, in addition, by the apparatus according to the disclosure. The respective regulation device 3A, 3B for driving the respectively associated converter unit 2, 13 independently of the regulation devices 3A, 3B of each of the other converter units 2, 13 results in the apparatus according to the disclosure being of redundant design, therefore resulting in high availability and a high level of maintenance friendliness of the overall system. Furthermore, the apparatus according to the disclosure for carrying out the method according to the disclosure by means of the regulation devices 3A, 3B allows the k-th stator current harmonics with respect to the stator current fundamental to be reduced in both stator winding sets A, B of the rotating electrical machine 1, where k=6n+/−1 and n=1, 3, 5, ....

As shown in FIG. 2 and FIG. 3, each regulation device 3A, 3B can have a second calculation unit 5 for formation of the associated first stator flux value $\psi_{1A}$, $\psi_{1B}$ from the DC voltages $U_{DCA}$, $U_{DCB}$ of the capacitive energy store 12, 14 which is connected to the respectively associated convert unit 2, 13, from the first stator current $i_{1A}$, $i_{1B}$ of the respectively associated stator winding set A, B and from the second stator current $i_{2A}$, $i_{2B}$ of the respectively associated stator winding set A, B. Furthermore, each regulation device 3A, 3B advantageously has, as is shown in FIG. 2 and FIG. 3, a third calculation unit 6 for formation of the associated second stator flux value $\psi_{2A}$, $\psi_{2B}$ from the first stator current $i_{1A}$, $i_{1B}$ of each stator winding set A, B, and from the second stator current $i_{2A}$, $i_{2B}$ of each stator winding set A, B.

For each regulation device 3A, 3B from the three-phase rotating electrical machine 1 which is in the form of a synchronous machine, the third calculation unit 6 forms the associated second stator flux value $\psi_{2A}$, $\psi_{2B}$ additionally from the rotor position $\phi A$, $\phi B$ and from the field current $i_E$, with the rotor position $\phi A$, $\phi B$ and the field current $i_E$ being supplied to the third calculation unit 6, in particular as is shown in FIG. 2 and FIG. 3.

Furthermore, for each regulation device 3A, 3B in a three-phase rotating electrical machine 1 which is in the form of a synchronous machine, the first calculation unit 8 additionally forms the respectively associated total reference stator flux value $\psi_{ref,totA}$, $\psi_{ref,totB}$ from a correction value WA, WB, with the correction value WA, WB being dependent on the predeterminable reference stator flux value $\psi_{refA}$, $\psi_{refB}$, on the predeterminable reference torque value $M_{refA}$, $M_{refB}$, on the rotor frequency ω, or on the stator frequency ω, and the predeterminable reference stator flux value $\psi_{refA}$, $\psi_{refB}$, the predeterminable reference torque value $M_{refA}$, $M_{refB}$, the rotor frequency ω or the stator frequency ω being supplied to the first calculation unit 8. The first calculation unit 8 advantageously forms the respective correction value WA, WB using the associated formula mentioned above, in a general form, for the correction value W, and forms the respective total reference stator flux value $\psi_{ref,totA}$, $\psi_{ref,totB}$ using the associated formula mentioned above, in a general form, for the total reference stator flux value $\psi_{ref,tot}$.

As shown in FIG. 2 and FIG. 3, each regulation device 3A, 3B has a fourth calculation unit 9 for formation of the associated actual stator flux value $\psi_{actA}$, $\psi_{actB}$ from the first stator flux value $\psi_{1A}$, $\psi_{1B}$, from the second stator flux value $\psi_{2A}$, $\psi_{2B}$, from the difference stator flux value $\psi_{eA}$, $\psi_{eB}$ and from the correction value WA, WB. Furthermore, each regulation device 3 has a fifth calculation unit 10 for formation of the associated actual stator flux value $\psi_{actA}$, $\psi_{actB}$ from the first stator flux value $\psi_{1A}$, $\psi_{1B}$, from the second stator flux value $\psi_{2A}$, $\psi_{2B}$, from the difference stator flux value $\psi_{eA}$, $\psi_{eB}$, and from a correction value WA, WB.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Three-phase rotating electrical machine
2, 13 Converter unit
3A, 3B Regulation device
4A, 4B Measurement means
5 Second calculation unit
6 Third calculation unit
7 Subtractor
8 First calculation unit
9 Fourth calculation unit
10 Fifth calculation unit
11 Regulator unit
12, 14 Capacitive energy store
A, B Stator winding sets of the rotating electrical machine

What is claimed is:

1. A method for operation of a three-phase rotating electrical machine which has two stator winding sets and each stator winding set has three phase windings connected in a star circuit, and the star circuits of the stator winding sets have a phase shift of 30 degrees electrical with respect to one another, and an associated converter unit is respectively provided for each respective stator winding set, comprising:
   each respective stator winding set is fed by the associated converter unit; and
   a respective regulation device is provided for each converter unit, and each converter unit is driven by means of a drive signal from the associated regulation device independently of regulation devices of the respective other converter units,
   wherein, with regard to the respective regulation device, the drive signal is produced in the regulation device by regulation of an actual torque value ($M_{actA}$, $M_{actB}$) at a predeterminable reference torque value ($M_{refA}$, $M_{refB}$) and a regulation of an actual stator flux value ($\psi_{actA}$, $\psi_{actB}$) at a total reference stator flux value ($\psi_{ref,totA}$, $\psi_{ref,totB}$), and wherein, with regard to the respective regulation device, the total reference stator flux value ($\psi_{ref,totA}$, $\psi_{ref,totB}$) is formed from a predeterminable reference stator flux value ($\psi_{refA}$, $\psi_{refB}$) and from a difference stator flux value ($\psi_{eA}$, $\psi_{eB}$) with a difference stator flux value ($\psi_{eA}$, $\psi_{eB}$) being calculated from a difference between a first stator flux value ($\psi_{1A}$, $\psi_{1B}$) and a second stator flux value ($\psi_{2A}$, $\psi_{2B}$).

2. The method as claimed in claim 1, wherein with regard to the respective regulation device, the first stator flux value ($\psi_{1A}$, $\psi_{1B}$) is formed from a DC voltage ($U_{DCA}$, $U_{DCB}$) of a capacitive energy store, which is connected to the associated converter unit, from a first stator current ($i_{1A}$, $i_{1B}$) of the respective stator winding set, and from a second stator current ($i_{2A}$, $i_{2B}$) of the respectively stator winding set,
   and wherein, with regard to the respective regulation device, the second stator flux value ($\psi_{2A}$, $\psi_{2B}$) is formed from the first stator current ($i_{2A}$, $i_{2B}$) of each stator winding set and from the second stator current ($i_{2A}$, $i_{2B}$) of each stator winding set.

3. The method as claimed in claim 2, wherein for the three-phase rotating electrical machine in a form of a synchronous machine, with regard to the respective regulation device, the second stator flux value ($\psi_{2A}$, $\psi_{2B}$) is additionally formed from a rotor position ($\phi A$, $\phi B$) and from a field current ($i_E$).

4. The method as claimed in claim 3, wherein for the three-phase rotating electrical machine in the form of the synchronous machine, with regard to the respective regulation device, the total reference stator flux value ($\psi_{ref, totA}$, $\psi_{ref, totB}$) is additionally formed from a correction value, with the correction value being dependent on the predeterminable reference stator flux value ($\psi_{refA}$, $\psi_{refB}$), on the predeterminable reference torque value ($M_{refA}$, $M_{refB}$), on rotor frequency ($\omega$), or on stator frequency ($\omega$).

5. The method as claimed in claim 1, wherein for the three-phase rotating electrical machine in a form of a synchronous machine, with regard to the respective regulation device, the total reference stator flux value ($\psi_{ref, totA}$, $\psi_{ref, totB}$) is additionally formed from a correction value, with the correction value being dependent on the predeterminable reference stator flux value ($\psi_{refA}$, $\psi_{refB}$), on the predeterminable reference torque value ($M_{refA}$, $M_{refB}$), on rotor frequency ($\omega$), or on stator frequency ($\omega$).

6. The method as claimed in claim 5, wherein with regard to the respective regulation device, the actual stator flux value ($\psi_{actA}$, $\psi_{actB}$), is formed from the first stator flux value ($\psi_{1A}$, $\psi_{1B}$), from the second stator flux value ($\psi_{2A}$, $\psi_{2B}$), from the difference stator flux value ($\psi_{eA}$, $\psi_{eB}$) and from the correction value, with the correction value being dependent on the predeterminable reference stator flux value ($\psi_{refA}$, $\psi_{refB}$), on the predeterminable reference torque value ($M_{refA}$, $M_{refB}$), on the rotor frequency ($\omega$) or on the stator frequency ($\omega$).

7. The method as claimed in claim 1, wherein with regard to the respective regulation device, the actual stator flux value ($\psi_{actA}$, $\psi_{actB}$), is formed from the first stator flux value ($\psi_{1A}$, $\psi_{1B}$), from the second stator flux value ($\psi_{2A}$, $\psi_{2B}$), from the difference stator flux value ($\psi_{eA}$, $\psi_{eB}$) and from a correction value, with the correction value being dependent on the predeterminable reference stator flux value ($\psi_{refA}$, $\psi_{refB}$), on the predeterminable reference torque value ($M_{refA}$, $M_{refB}$), on rotor frequency ($\omega$) or on stator frequency ($\omega$).

8. The method as claimed in claim 7, wherein with regard to the respective regulation device, the actual torque value ($M_{actA}$, $M_{actB}$), is formed from the actual stator flux value ($\psi_{actA}$, $\psi_{actB}$), from a first stator current ($i_{1A}$, $i_{1B}$) in the respective stator winding set, and from a second stator current ($i_{2A}$, $i_{2B}$) in the respective stator winding set.

9. The method as claimed in claim 1, wherein with regard to the respective regulation device, the actual torque value ($M_{actA}$, $M_{actB}$), is formed from the actual stator flux value ($\psi_{actA}$, $\psi_{actB}$), from a first stator current ($i_{1A}$, $i_{1B}$) in the respective stator winding set, and from a second stator current ($i_{2A}$, $i_{2B}$) in the respective stator winding set.

10. An apparatus for carrying out a method for operation of a three-phase rotating electrical machine which has at least two stator winding sets, each stator winding set (A, B) comprising three phase windings connected in a star circuit, wherein the star circuits of the stator winding sets have a phase shift of 30 degrees electrical with respect to one another,
wherein each stator winding set having an associated converter unit which is intended to feed each stator winding set, and
wherein each stator winding set having an associated regulation device, which is provided for each converter unit, in order to drive the associated converter unit by means of a drive signal independently of regulation devices of the respective other converter units,
wherein each regulation device has a regulator unit for regulation of an associated current torque value ($M_{actA}$, $M_{actB}$) at a predeterminable reference torque value ($M_{refA}$, $M_{refB}$), and for regulation of an associated actual stator flux value ($\psi_{actA}$, $\psi_{actB}$) at a predeterminable reference stator flux value ($\psi_{ref, totA}$, $\psi_{ref, totB}$), with a drive signal being produced at an output of the regulator unit,
wherein each regulation device has a first calculation unit for formation of an associated total reference stator flux value ($\psi_{ref, totA}$, $\psi_{ref, totB}$) from a predeterminable reference stator flux value ($\psi_{refA}$, $\psi_{refB}$) and from a difference stator flux value ($\psi_{eA}$, $\psi_{eB}$), and
wherein each regulation device has a subtractor for calculation of an associated difference stator flux value ($\psi_{eA}$, $\psi_{eB}$) from an difference between a first stator flux value ($\psi_{1A}$, $\psi_{1B}$) and a second stator flux value ($\psi_{2A}$, $\psi_{2B}$).

11. The apparatus as claimed in claim 10, wherein each regulation device has a second calculation unit for formation of the associated first stator flux value ($\psi_{1A}$, $\psi_{1B}$) from DC voltage ($U_{DCA}$, $U_{DCB}$) of a capacitive energy store which is connected to the converter unit, from a first stator current ($i_{1A}$, $i_{1B}$) of a respective stator winding set and from a second stator current ($i_{2A}$, $i_{2B}$) of the respective stator winding set,
and wherein each regulation device has a third calculation unit for formation of the associated second stator flux value ($\psi_{2A}$, $\psi_{2B}$) from the first stator current ($i_{1A}$, $i_{1B}$) in each stator winding set and from the second stator current ($i_{2A}$, $i_{2B}$) in each stator winding set.

12. The apparatus as claimed in claim 11, wherein for each regulation device, the third calculation unit additionally forms the associated second stator flux value ($\psi_{2A}$, $\psi_{2B}$) from a rotor position ($\phi A$, $\phi B$) and from field current ($i_E$), with the rotor position ($\phi A$, $\phi B$) and the field current ($i_E$) being supplied to the third calculation unit.

13. The apparatus as claimed in claim 12, wherein for each regulation device, the first calculation unit forms the associated total reference stator flux value ($\psi_{ref, totA}$, $\psi_{ref, totB}$) additionally from a correction value, with the correction value being dependent on the predeterminable reference stator flux value ($\psi_{refA}$, $\psi_{refB}$), on the predeterminable reference torque value ($M_{refA}$, $M_{refB}$), on rotor frequency ($\omega$) or on stator frequency ($\omega$), and with the predeterminable reference stator flux value ($\omega_{refA}$, $\psi_{refB}$), the predeterminable reference torque value ($M_{refA}$, $M_{refB}$), the rotor frequency ($\omega$) or the stator frequency ($\omega$) being supplied to the first calculation unit.

14. The apparatus as claimed in claim 10, wherein for each regulation device in the three-phase rotating electrical machine in the form of a synchronous machine, the first calculation unit forms the associated total reference stator flux value ($\psi_{ref, totA}$, $\psi_{ref, totB}$) additionally from a correction value, with the correction value being dependent on the predeterminable reference stator flux value ($\psi_{refA}$, $\psi_{refB}$), on the predeterminable reference torque value ($M_{refA}$, $M_{refB}$), on rotor frequency ($\omega$), or on stator frequency ($\omega$), and with the predeterminable reference stator flux value ($\psi_{refA}$, $\psi_{refB}$), the predeterminable reference torque value ($M_{refA}$, $M_{refB}$), the rotor frequency ($\omega$) or the stator frequency ($\omega$) being supplied to the first calculation unit.

15. The apparatus as claimed in claim 14, wherein each regulation device has a fourth calculation unit for formation of the associated actual stator flux value ($\psi_{actA}$, $\psi_{actB}$) from the first stator flux value ($\psi_{1A}$, $\psi_{1B}$), from the second stator flux value ($\psi_{2A}$, $\psi_{2B}$), from the difference stator flux value ($\psi_{eA}$, $\psi_{eB}$) and from the correction value, with the correction value being dependent on the predeterminable reference stator flux value ($\psi_{refA}$, $\psi_{refB}$), on the predeterminable reference torque value ($M_{refA}$, $M_{refB}$), on the rotor frequency ($\omega$) or on the stator frequency ($\omega$).

16. The apparatus as claimed in claim 10, wherein each regulation device has a fourth calculation unit for formation of the associated actual stator flux value ($\psi_{actA}$, $\psi_{actB}$) from the first stator flux value ($\psi_{1A}$, $\psi_{1B}$), from the second stator flux value ($\psi_{2A}$, $\psi_{2B}$), from the difference stator flux value ($\psi_{eA}$, $\psi_{eB}$) and from a correction value, with the correction value being dependent on the predeterminable reference stator flux value ($\psi_{refA}$, $\psi_{refB}$), on the predeterminable reference torque value ($M_{refA}$, $M_{refB}$), on rotor frequency ($\omega$) or on stator frequency ($\omega$).

17. The apparatus as claimed in claim 16, wherein each regulation device has a fifth calculation unit for formation of the associated actual torque value ($M_{actA}$, $M_{actB}$) from the actual stator flux value ($\psi_{actA}$, $\psi_{actB}$), from a first stator current ($i_{1A}$, $i_{1B}$) in the respective stator winding set, and from a second stator current ($i_{2A}$, $i_{2B}$) in the respective stator winding set.

18. The apparatus as claimed in claim 10, wherein each regulation device has a fifth calculation unit for formation of the associated actual torque value ($M_{actA}$, $M_{actB}$) from the actual stator flux value ($\psi_{actA}$, $\psi_{actB}$), from a first stator current ($i_{1A}$, $i_{1B}$) in a respective stator winding set, and from a second stator current ($i_{2A}$, $i_{2B}$) in the respective stator winding set.

19. A system based on a three-phase rotating electrical machine, comprising:

two stator winding sets, each stator winding set having three phase windings connected in a star circuit, wherein each star circuit of the stator winding sets having a phase shift of 30 degrees electrical with respect to one another;

an associated converter unit provided for each stator winding set, respectively, the respective stator winding set being fed by the associated converter unit; and an associated regulation device provided for each converter unit, each converter unit being driven by a drive signal from the associated regulation device that is independent of regulation devices of the other converter units, wherein, with regard to each respective regulation device, the drive signal is produced in the respective regulation device by regulation of an actual torque value ($M_{actA}$, $M_{actB}$) at a predeterminable reference torque value ($M_{refA}$, $M_{refB}$) and a regulation of an actual stator flux value ($\psi_{actA}$, $\psi_{actB}$) at a total reference stator flux value ($\psi_{ref,\,totA}$, $\psi_{ref,\,totB}$), wherein, with regard to each associated regulation device, the total reference stator flux value ($\psi_{ref,\,totA}$, $\psi_{ref,\,totB}$) is formed from a predeterminable reference stator flux value ($\psi_{refA}$, $\psi_{refB}$) and from a difference stator flux value ($\psi_{eA}$, $\psi_{eB}$), with the difference stator flux value ($\psi_{eA}$, $\psi_{eB}$) being calculated from the difference between a first stator flux value ($\psi_{1A}$, $\psi_{1B}$) and a second stator flux value ($\psi_{2A}$, $\psi_{2B}$).

* * * * *